April 8, 1958
S. B. NORRIS, JR
2,830,012
PROCESS FOR RE-REFINING KEROSENE
Filed Aug. 4, 1955
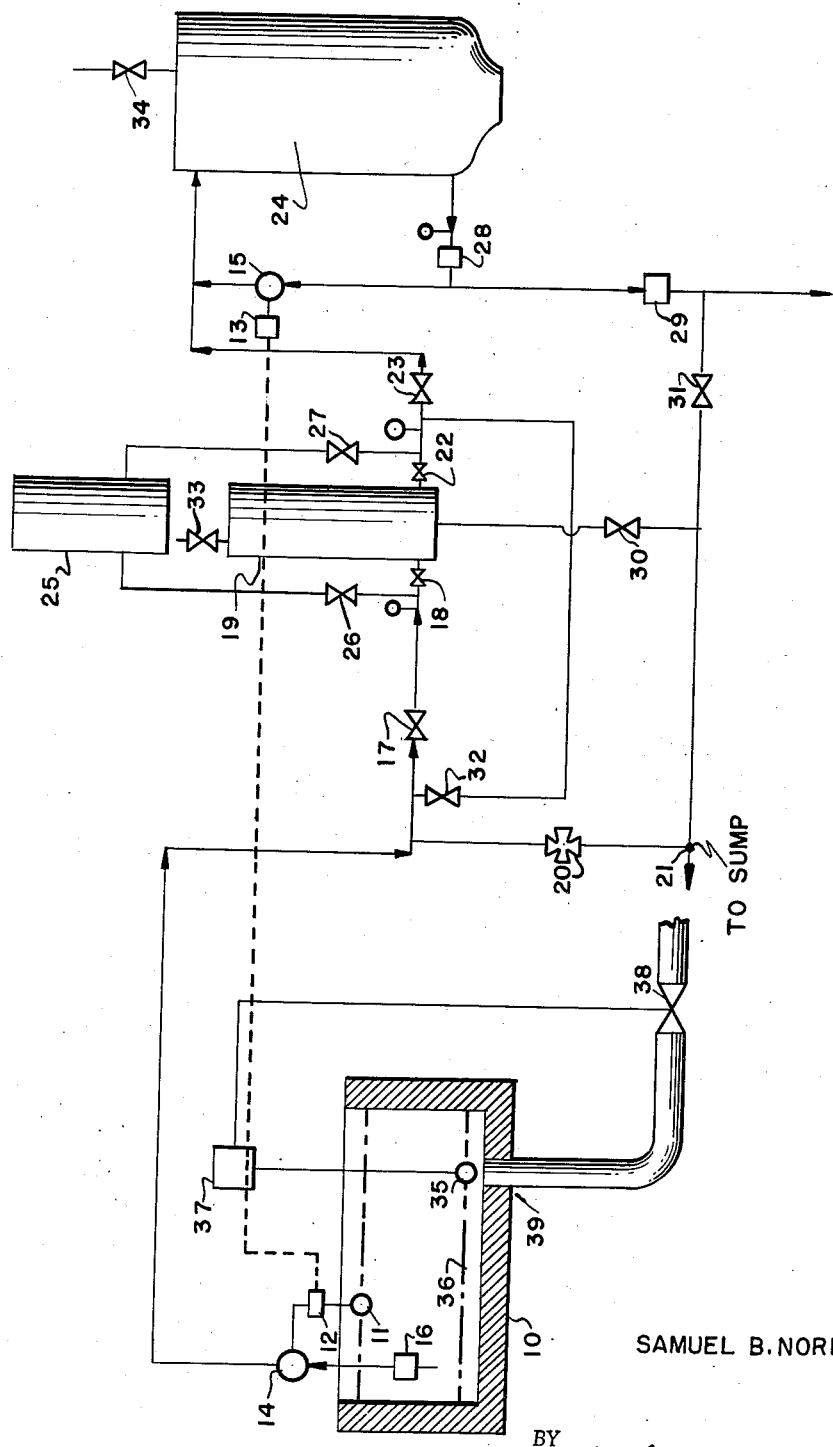
INVENTOR
SAMUEL B. NORRIS, JR.
BY
Cushman, Darby & Cushman
ATTORNEYS

United States Patent Office 2,830,012
Patented Apr. 8, 1958

2,830,012

PROCESS FOR RE-REFINING KEROSENE

Samuel B. Norris, Jr., Mesilla Park, N. Mex., assignor, by mesne assignments, to John G. Palm, C. Elliott Armstrong, C. W. Lyons, Sam B. Norris, Jr., and Claude A. McHugh Application August 4, 1955, Serial No. 526,447

12 Claims. (Cl. 196—15)

This invention relates to a process and apparatus for re-refining used kerosene. More specifically, the invention relates to the re-refinement of kerosene which has been used in washing aircraft.

My method comprises collecting used kerosene wash solution in a sump, allowing water in said solution to settle out, thereafter pumping said solution into a adsorption tower through a line strainer and filtering vessel, feeding said solution through said adsorption tower to remove all remaining impurities such as polymerization products, dissolved aircraft grease, soap and the like, and returning the re-refined kerosene to a tank for reuse.

The washing of aircraft requires the use of a fresh kerosene-soapy water solution which is applied to the skin and engines of the aircraft. The aircraft is then washed down with water, and all kerosene and soapy water runs into a sump located near the apron upon which the aircraft rests.

In the past, the kerosene and soapy water went from the sump to a sewer where it was disposed of as waste. However, it has been found desirable to re-refine this waste solution by some process and apparatus so as to reutilize the kerosene and effect a substantial saving in costs of raw materials.

For this purpose, I devised process and apparatus whereby all impurities such as soapy water, polymerization products, dissolved aircraft grease and the like are removed from the used kerosene solution. The kerosene can then be reutilized as needed.

With the above in mind, it is the primary object of the present invention to provide a method and apparatus adapted to re-refine used kerosene wash solution.

It is another object of this invention to provide a process for re-refining a used kerosene wash solution, said process comprising collecting used kerosene wash solution in a sump, allowing water in said solution to settle out, thereafter pumping said solution into an adsorption tower through a line strainer and filtering vessel, feeding said solution through said adsorption tower to remove all remaining impurities such as polymerization products, dissolved aircraft grease, soap and the like, and returning the re-refined kerosene to a tank for reuse.

It is still another object of this invention to provide apparatus for re-refining a used kerosene wash solution, said apparatus comprising collecting means for the said solution, strainer and filtering means, an adsorption tower, and pumping means for pumping said solution from said collecting means through said straining means, filtering means, and adsorption tower into a kerosene storage tank.

It is an additional object of this invention to provide an adsorption tower for use with the method and apparatus described heretofore, said adsorption tower including as the adsorption media, bauxite and alumina.

Another important object of this invention is to provide pump and drain control means located in the sump tank for use in the process described heretofore, said pump control means comprising a float and switch, said switch closing at a predetermined level of kerosene wash solution in the sump to thereby actuate pumping means associated with said sump and recycle pumping means associated with the said adsorption tower, and said drain control means comprising a float and solenoid, said solenoid being actuated at a predetermined level of water in the kerosene-water solution to thereby drain water from the bottom of the sump.

Other objects and advantages of the invention will be apparent during the course of the following description.

In the accompanying drawing forming a part of this application, and in which like numerals are employed to designate like parts throughout the same, is illustrated a flow diagram of my novel method and apparatus.

A preferred embodiment of this invention as illustrated in the drawing, comprises five basic components, namely, (a) a sump used as collecting means for the used kerosene wash solution; (b) float switch means whereby pumping means utilized in my process are actuated at predetermined levels of kerosene wash solution in the said sump and whereby soapy water is drained out from the bottom of said sump; (c) straining and filtering means; (d) an adsorption tower; and (e) pump means utilized to pump used kerosene wash solution from said sump through said strainer and filtering means into and out of said adsorption tower, and, in addition, to recycle kerosene solution through said adsorption tower and into a kerosene storage tank for reuse.

My method involves re-refining used kerosene wash solution, said wash solution normally being obtained as a waste product from a process for washing aircraft. The kerosene wash solution is collected in a sump 10 and allowed to settle therein for a suitable amount of time. This settling time permits a substantial amount of water to settle out with accompanying flotation of impure kerosene on the surface thereof. Of course, the longer the settling time in the sump, the greater is the amount of water that will settle out of the kerosene. In normal practice, sufficient time for settlement is allowed to separate about 95% of the water present in the kerosene wash solution to be re-refined. A large enough sump and a long enough settling time would permit substantially greater separation of the water, but practical convenience dictates a maximum of 95% separation.

When the kerosene wash solution reaches a stipulated level in sump 10, the float 11 is moved upwardly a sufficient distance to close ganged electric switches 12 and 13. Closing of said switches 12 and 13 begins operation of pumps 14 and 15.

Pump 14 operates to carry the wash solution from the sump 10 through a line strainer 16, wherein larger foreign particles are removed, through normally open valves 17 and 18 into a micronic filter vessel 19. In vessel 19 smaller particles of foreign insoluble materials, such as dust, dirt and grit, are removed from the kerosene wash solution being treated.

The pressure drop through the filtering vessel is quite small when the cartridges therein are clean. However, after a certain amount of filtered material is accumulated therein, it can be appreciated that the pressure drop would increase substantially until the filter cartridges are changed. In order to prevent any damage to the sump pump that might be created by an abnormal build-up of pressure due to extreme clogging of the filter cartridges, safety valve 20 is provided and is designed to open into drain line 21 after a maximum allowable line pressure is exceeded.

From filter vessel 19, the filtered solution passes through normally open valves 22 and 23 into adsorption tower 24. It should be noted that an additional filter vessel 25 is included with my apparatus. This filtering vessel is utilized when the filter cartridges of vessel 19 are changed. By closing valves 18 and 22, and opening normally closed valves 26 and 27, filter vessel 25 is placed in the system while vessel 19 is undergoing reconditioning. Thus, the system need not be shut down during this time.

The aforementioned recycle pump 15 can be used to recycle kerosene, in a ratio of about 4 to 1, through the adsorption tower. The recycled kerosene solution passes through strainer 28 back into the adsorption tower. Of course, coincidentally, re-refined kerosene is being withdrawn through positive displacement meter 29 and on into kerosene storage tanks for reuse.

The adsorption tower functions to remove polymerization products, entrained water cloud, and dissolved aircraft grease that remains in the filtered kerosene solution. The adsorption media used are bauxite and activated alumina. As noted heretofore, the bauxite is present to remove hydrocarbon contaminants, and represents not less than 92% of the media and preferably 95% thereof. The activated alumina is present in the media for the adsorption of the entrained water cloud from the kerosene and represents not more than 8% of the media with 5% being preferred.

Actually, the specific ratio of bauxite to alumina is dependent upon the percent of water entrained in the kerosene after settling in the sump. The longer the settling time in the sump, the greater is the amount of water that settles out, and consequently, the lesser is the amount of activated alumina required in the adsorption media. As noted heretofore, the optimum composition ratio is 95:5, bauxite to alumina.

It should be stressed that the combined use of bauxite and activated alumina represents a primary aspect of my invention and functions to simultaneously clarify and re-refine the kerosene solution undergoing treatment. This combination of adsorption media provides an affinity for the impurities of the solutions being treated, e. g., dissolved polymerization products and water cloud, of greatly significant degree attributable to their high degree of porosity and inherent adsorption characteristics.

The particle size of the bauxite and activated alumina is such that one vertical foot thereof, in a six inch diameter vertical column will result in 1.0 pound per square inch gauge pressure drop when 40° A. P. I. kerosene is pumped through the media at the rate of 25 gallons per minute and with the temperature of kerosene at 60° F.

Normally closed valves 30 and 31 should also be noted, since they provide for periodic draining of the adsorption tower and filter vessel to the sump. Normally closed valve 32 is merely provided as a means for by-passing the filter stage. Normally, such by-pass line is not utilized except for emergency operation.

In addition, attention is directed to valves 33 and 34. These valves are merely outlets for bleeding air accumulated in the filter vessel and adsorption tower, respectively.

Float 35 is located at the interface 36 of the kerosene-on-water which is formed in sump tank 10 after settling. When the water exceeds a certain level, electric solenoid 37 is actuated, which in turn opens drain valve 38 allowing water to be drained out from the bottom of the sump tank.

As noted heretofore, the apparatus utilized to carry out my novel method for re-refining used kerosene comprises five basic components. The sump 10 can be a standard collecting tank equipped with a drain 39 on the bottom thereof. The used kerosene wash solution is collected in said sump until it reaches a level sufficient to raise float valve 11 and actuate switches 12 and 13. Upon actuation of these switches, rotary pumps 14 and 15 go into operation and begin circulation of the kerosene as described heretofore.

The line strainer 16 is of standard construction and operates to remove coarse insoluble materials such as dust, dirt and grit. Micronic filter 19 is utilized for filtering out the smaller insoluble particles in the kerosene being treated. I utilized a filter with eight filter cartridges capable of filtering 25 gallons per minute of kerosene. However, any commercial micronic filter of the correct capacity can be used. Of course, substitute filter vessel 25, which is placed in the system while vessel 19 is undergoing reconditioning, is of the same type.

The adsorption tower 24 functions to remove polymerization products, entrained water cloud, and dissolved aircraft grease. As stated heretofore, this restores the kerosene to its original pale yellow color.

The adsorption tower 24 includes bauxite and activated alumina as the adsorption media. As noted heretofore, the ratio by weight of bauxite to alumina is preferably 95:5. However, as can be appreciated, this ratio is related to the percent water left in the kerosene as entrained water.

The adsorption vessel is equipped with recycle pump 15, which recycles kerosene in a ratio of 4:1. As noted, the recycle pump is started and stopped by the same float mechanism which operates the sump pump.

The purpose of the recycle pump is to increase the contact time of a unit volume of kerosene with the adsorption media. The clarification of the oil by the media is not instantaneous and a certain contact time is required in order for the dissolved polymerization products, aircraft grease, and water cloud to be adsorbed. The recycle step is, therefore, employed to obtain the maximum media life and to minimize the size of the adsorption tower.

The remainder of the apparatus used in the system including solenoid 37 and all of the valves is standard and any commercial type operating in the way intended would be suitable. Safety valve 20 is designed to open into drain line 21 at a predetermined line pressure in order to prevent any damage to the sump pump 14. Positive displacement meter 29 is also standard and is used to measure the amount of kerosene that has been re-refined prior to being stored in storage tanks not shown.

From the above explanation of the various aspects of this invention, it will be readily apparent that a novel process and apparatus for re-refining used kerosene is provided having improved features and, yet, utilizing simple apparatus and principles which persons skilled in the art can understand and maintain in operating condition.

Of course, when the level of kerosene wash solution has descended sufficiently, pumps 14 and 15 will be de-actuated and circulation will cease. Likewise, with reference to float 35 and solenoid 37, when the water layer of the wash solution descends to a predetermined level, drain valve 38 closes and draining of the water from the sump will temporarily cease. The system is thus constantly ready for utilization depending upon the amount of used kerosene wash solution being collected in the sump tank.

It should be stressed that the novel principles of this invention are broader than the specific embodiments recited above. Accordingly, rather than unduly extend this disclosure by attempting to list all the numerous modifications that have been conceived and reduced to practice during this development, these novel features are defined in the following claims.

I claim:

1. A method for re-refining used kerosene in a kerosene wash solution comprising collecting used kerosene wash solution in a sump, allowing said solution to settle for a time period sufficiently long in duration to allow settling out of at least 95% of the water in the wash solution thereby forming a kerosene-on-water formation, pumping the upper used kerosene layer through a straining zone to thereby remove large solid impurities, pumping said strained kerosene through a filtering zone to remove fine solid impurities, pumping said strained and filtered kerosene through an adsorption zone to remove dissolved and entrained impurities, recycling said strained and filtered kerosene layer through the said adsorption zone in a ratio of not less than 4 to 1, and collecting the re-refined kerosene for reuse.

2. A method as claimed in claim 1 wherein the level of kerosene wash solution actuates and deactuates the pumping means used to pump the said kerosene layer through said straining, filtering and adsorption zone, and to recycle said kerosene through the said adsorption zone.

3. A method as claimed in claim 1 wherein the water layer is periodically drained from the lower end of said sump, said draining period being determined by the level of water in the kerosene-on-water formation.

4. A method for re-refining used kerosene in a kerosene wash solution comprising collecting used kerosene wash solution in a sump, allowing said solution to settle for a time period sufficiently long in duration to allow settling out of at least 95% of the water in the wash solution thereby forming a kerosene-on-water formation, pumping the upper used kerosene layer through a straining zone to thereby remove large solid impurities, pumping said strained kerosene through a filtering zone to remove fine solid impurities, pumping said strained and filtered kerosene through an adsorption zone including bauxite and activated alumina as the adsorption media to remove dissolved and entrained impurities, recycling said strained and filtered kerosene layer through the said adsorption zone in a ratio of not less than 4 to 1, and collecting the re-refined kerosene for reuse.

5. A method as claimed in claim 4 wherein the bauxite is in amount of not less than 92% by weight.

6. A method as claimed in claim 4 wherein the bauxite is in amount of about 95% by weight and the activated alumina is in amount of about 5% by weight.

7. Apparatus for re-refining used kerosene in a kerosene wash solution comprising collecting means for collecting kerosene wash solution and forming a kerosene-on-water formation, line strainers connected to said collecting means for removing large solid impurities from the said kerosene layer upon passage of the latter from the collecting means through said line strainers, at least one primary filter vessel connected in series with said line strainers for filtering fine solid impurities from said kerosene layer, an adsorption tower connected in series with said primary filter vessel for adsorbing dissolved and entrained impurities from said kerosene, primary pumping means for pumping said kerosene from the collecting means through the strainers, filter vessel and adsorption tower, pump control means associated with said collecting means for actuating said primary pumping means and comprising a float and switch, said switch being controlled by said float and closing at a predetermined level of kerosene-on-water formation in said collecting means, and drain control means associated with said collecting means for periodically draining water from the lower end of said collecting means and comprising a float and solenoid, said solenoid being controlled by said float and being actuated at a predetermined level of water in the kerosene-on-water formation of said collecting means.

8. Apparatus as claimed in claim 7 including secondary pumping means for recycling kerosene through said adsorption tower and wherein said pump control means actuates said secondary pumping means.

9. Apparatus as claimed in claim 7 wherein said filter vessel includes at least eight micronic filter cartridges capable of filtering at least 25 gallons of kerosene per minute.

10. Apparatus as claimed in claim 7 including a secondary filter vessel utilized when said primary filter vessel is being reconditioned.

11. Apparatus as claimed in claim 7 wherein said adsorption tower includes bauxite and activated alumina as the adsorption media and wherein said bauxite is in amount of not less than 92% by weight.

12. Apparatus as claimed in claim 7 wherein said bauxite is in amount of about 95% by weight and the said activated alumina is in amount of about 5% by weight.

References Cited in the file of this patent

UNITED STATES PATENTS

| | | |
|---|---|---|
| 1,661,478 | Johnson | Mar. 6, 1928 |
| 1,720,185 | Miller | July 9, 1929 |
| 1,820,334 | Wiesman | Aug. 26, 1931 |
| 1,932,525 | Jacobson et al. | Oct. 31, 1933 |
| 2,019,896 | Edlich | Nov. 5, 1935 |
| 2,142,726 | Hetzer | Jan. 3, 1939 |
| 2,314,256 | Vaughan | Mar. 16, 1943 |